(12) United States Patent
Paukner et al.

(10) Patent No.: US 12,497,021 B2
(45) Date of Patent: *Dec. 16, 2025

(54) METHOD FOR OPERATING A HYBRID DRIVE SYSTEM OF A MOTOR VEHICLE, HYBRID DRIVE SYSTEM, AND MOTOR VEHICLE

(71) Applicant: Volkswagen Aktiengesellschaft, Wolfsburg (DE)

(72) Inventors: Stefan Paukner, Wolfsburg (DE); Falk-Christian Von Ceumern-Lindenstjerna, Braunschweig (DE); Johannes Westendorf, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 235 days.

This patent is subject to a terminal disclaimer.

(21) Appl. No.: 18/112,288

(22) Filed: Feb. 21, 2023

(65) Prior Publication Data

US 2023/0264680 A1 Aug. 24, 2023

(30) Foreign Application Priority Data

Feb. 22, 2022 (DE) ...................... 10 2022 104 183.2

(51) Int. Cl.
 *B60W 20/15* (2016.01)
 *B60W 10/02* (2006.01)
 (Continued)

(52) U.S. Cl.
 CPC ............ *B60W 20/15* (2016.01); *B60W 10/02* (2013.01); *B60W 10/06* (2013.01); *B60W 10/18* (2013.01);
 (Continued)

(58) Field of Classification Search
 None
 See application file for complete search history.

(56) References Cited

U.S. PATENT DOCUMENTS

| 6,616,570 B2 | 9/2003 | Wakashiro et al. |
| 2009/0098976 A1* | 4/2009 | Usoro .................... B60K 6/547 |
| | | 903/905 |

(Continued)

FOREIGN PATENT DOCUMENTS

| CN | 110939686 A | * | 3/2020 | .............. F16F 15/26 |
| DE | 102004061912 A1 | * | 8/2005 | ............. F02D 37/00 |

(Continued)

OTHER PUBLICATIONS

CN-110939686, Ye, 2020.*
DE-102004048606, Steuernagel, 2006.*

*Primary Examiner* — Rachid Bendidi
*Assistant Examiner* — Nada Mahyoob Alqaderi
(74) *Attorney, Agent, or Firm* — Muncy, Geissler, Olds & Lowe, P.C.

(57) ABSTRACT

A method for operating a hybrid drive system of a motor vehicle, in which an internal combustion engine with a belt-driven starter generator coupled thereto is operated in an overrun mode for braking of the motor vehicle, wherein, in order to avoid a delivering of air to an exhaust system of the hybrid drive system, the internal combustion engine is configured in such a manner that intake valves and/or exhaust valves of the internal combustion engine remain closed during a rotation of a crankshaft of the internal combustion engine. A hybrid drive system for a motor vehicle and a motor vehicle having a hybrid drive system are also provided.

10 Claims, 3 Drawing Sheets

(51) Int. Cl.
*B60W 10/06* (2006.01)
*B60W 10/18* (2012.01)
(52) U.S. Cl.
CPC ... *B60W 2710/021* (2013.01); *B60W 2710/06* (2013.01)

(56) References Cited

U.S. PATENT DOCUMENTS

| | | | | |
|---|---|---|---|---|
| 2011/0053735 | A1* | 3/2011 | Lewis | F02D 41/126 |
| | | | | 477/99 |
| 2015/0239463 | A1* | 8/2015 | Ohmura | B60K 6/48 |
| | | | | 903/905 |
| 2016/0016462 | A1* | 1/2016 | Krafzig | B60W 20/15 |
| | | | | 180/65.28 |
| 2016/0032845 | A1* | 2/2016 | Boyer | F02D 41/0087 |
| | | | | 123/58.1 |
| 2016/0251012 | A1* | 9/2016 | Schneider | F01N 3/2066 |
| | | | | 701/22 |
| 2018/0162371 | A1* | 6/2018 | Colavincenzo | B60L 15/2054 |
| 2020/0238994 | A1* | 7/2020 | Yanagisawa | F16H 61/0031 |
| 2021/0381446 | A1* | 12/2021 | Etzel | B60W 10/02 |
| 2022/0024441 | A1* | 1/2022 | Jun | B60K 6/24 |

FOREIGN PATENT DOCUMENTS

| | | | | |
|---|---|---|---|---|
| DE | 102004048606 A1 * | 4/2006 | | B60K 6/48 |
| DE | 60223858 T2 | 4/2008 | | |
| DE | 112017006292 T5 * | 8/2019 | | B60L 58/16 |
| JP | 2009292246 A | 12/2009 | | |
| JP | 2014004941 A * | 1/2014 | | |
| RU | 2534465 C2 * | 11/2014 | | B60W 10/08 |

* cited by examiner

METHOD FOR OPERATING A HYBRID DRIVE SYSTEM OF A MOTOR VEHICLE, HYBRID DRIVE SYSTEM, AND MOTOR VEHICLE

This nonprovisional application claims priority under 35 U.S.C. § 119(a) to German Patent Application No. 10 2022 104 183.2, which was filed in Germany on Feb. 22, 2022, and which is herein incorporated by reference.

BACKGROUND OF THE INVENTION

Field of the Invention

The present invention relates to a method for operating a hybrid drive system of a motor vehicle. The invention additionally relates to a hybrid drive system for a motor vehicle, and to a motor vehicle having a hybrid drive system.

Description of the Background Art

Motor vehicles with hybrid drive systems are known in which the hybrid drive system has an internal combustion engine, a transmission, an exhaust system for the internal combustion engine, and a control device. Arranged between the internal combustion engine and an output of the hybrid drive system is a first clutch. Generic drive systems are known from the documents US 2015/0239463 A1 and JP 2009-292246 A1, for example, wherein these hybrid drive systems additionally have a drivetrain generator that can be decoupled from the output by means of a second clutch. The internal combustion engine can be uncoupled from the output so that the moving vehicle can coast with reduced resistance when the internal combustion engine is shut off. Such an operating state is also referred to as "sailing mode."

Furthermore, hybrid drive systems are known that have a belt-driven starter generator, which is coupled to the internal combustion engine directly or indirectly, for example through a transmission. The belt-driven starter generator, together with the internal combustion engine, can be uncoupled from the output by means of the first clutch.

Furthermore, hybrid drive systems often have a spark-ignition engine as the internal combustion engine, as well as a three-way catalytic converter, and often a particulate filter in addition, for purifying the emissions of the spark-ignition engine. Modern hybrid drive systems have two three-way catalytic converters, of which a first three-way catalytic converter is arranged in the vicinity of the internal combustion engine and a second three-way catalytic converter is arranged in an underbody position of the motor vehicle.

Known hybrid drive systems have the disadvantage that air is drawn in through the internal combustion engine and fed into the exhaust system in an operating state in which the internal combustion engine does not deliver any thrust and is being overrun by the output. In this case, oxygen builds up in the three-way catalytic converters, which leads to increased emission levels, in particular NOx emissions, when the internal combustion engine begins operation. Until now, this problem has been solved by intentionally burning off the oxygen from the three-way catalytic converters. This, in turn, leads to increased fuel consumption of the hybrid drive system.

SUMMARY OF THE INVENTION

It is therefore an object of the present invention to remedy or to at least partially remedy the above-described disadvantages in a hybrid drive system. In particular, it is an object of the present invention to create a method for operating a hybrid drive system, as well as a hybrid drive system and a motor vehicle, that avoid oxygen buildup in the three-way catalytic converter in a simple and economical manner.

Accordingly, the object is attained by a method for operating a hybrid drive system of a motor vehicle, by a hybrid drive system for a motor vehicle, and by a motor vehicle. Of course, features and details that are described in connection with the method according to the invention also apply in connection with the hybrid drive system according to the invention as well as the motor vehicle according to the invention, and vice versa in each case, so mutual reference is or can always be made with regard to the disclosure of the individual aspects of the invention.

According to a first aspect of the invention, the object is attained by a method for operating a hybrid drive system of a motor vehicle. The hybrid drive system has an internal combustion engine with a belt-driven starter generator coupled thereto, a transmission, an exhaust system for the internal combustion engine, a control device, and an output. A first clutch is arranged between the internal combustion engine and the transmission. The method comprises: the control device bringing the motor vehicle to a first speed by controlling the internal combustion engine and/or the drive-train generator, the control device bringing about an operating state of the hybrid drive system in which the first clutch is disengaged, the control device shutting off the internal combustion engine, the control device detecting a braking demand for braking of the motor vehicle, the control device determining a potential crankshaft speed of the crankshaft in the case of a potentially engaged first clutch, the control device comparing the determined potential crankshaft speed with a predefined first limit speed, the control device engaging the first clutch for overrunning the internal combustion engine as well as for operating the belt-driven starter generator in a recuperation mode, and the control device configuring the internal combustion engine in such a manner that intake valves and/or exhaust valves of the internal combustion engine remain closed during a rotation of a crankshaft of the internal combustion engine.

The hybrid drive system with which the method according to the invention is carried out has the internal combustion engine with the belt-driven starter generator coupled thereto. The internal combustion engine is designed to drive the motor vehicle. Preferably, the internal combustion engine is designed as a spark-ignition engine. The belt-driven starter generator preferably is mechanically coupled to the crankshaft of the internal combustion engine by a transmission, such as, e.g., a single-stage gear transmission, a belt drive, or the like. According to the invention, an intermediate clutch can be provided in the torque flow between the belt-driven starter generator and the internal combustion engine to mechanically decouple the belt-driven starter generator from the crankshaft. The belt-driven starter generator is an electric motor that is designed to operate in a motor mode as well as a generator mode. The belt-driven starter generator is designed to convert electrical energy into rotational kinetic energy in motor mode. In this way, additional torque can be provided to support the internal combustion engine for driving the motor vehicle. Furthermore, the belt-driven starter generator is designed to convert rotational kinetic energy into electrical energy in generator mode. In this way, electrical energy can be provided for storage in a battery of the motor vehicle or for operating the drivetrain generator.

The internal combustion engine is mechanically coupled to the output of the hybrid drive system by the first clutch and the transmission. When the clutch is engaged, a torque can be transmitted from the crankshaft of the internal combustion engine to the output through the transmission. When the clutch is disengaged, the transmission of torque is interrupted. In this state, the combustion engine can be switched off or is designed to operate the belt-driven starter generator in generator mode, for example. In addition, the internal combustion engine is designed to be configurable in such a manner that intake valves and/or exhaust valves of the internal combustion engine can be switched in a way that is decoupled from a rotation of the crankshaft. Consequently, the intake valves or exhaust valves can be closed over multiple rotations of the crankshaft or over a relatively long period of time, for example when the crankshaft is rotating. In this way, it is possible to prevent the switched-off combustion engine in an overrun state from delivering air to the exhaust system for the internal combustion engine of the hybrid drive system. Preferably, the internal combustion engine is designed such that at least the intake valves can be closed in a manner that is decoupled from the rotation of the crankshaft.

The exhaust system is coupled in fluid communication to a combustion gas outlet of the internal combustion engine. Combustion gases from cylinders of the internal combustion engine can be discharged to an environment of the motor vehicle through the exhaust system. Preferably, the exhaust system has a particulate filter such as, e.g., a gasoline particulate filter, and a catalytic converter such as, e.g., a three-way catalytic converter. Provision can be made according to the invention that the exhaust system has multiple particulate filters and/or multiple catalytic converters or other devices for purifying the emissions. Preferably, the exhaust system has a first close-coupled three-way catalytic converter and a second three-way catalytic converter adjacent to a vehicle floor. It is preferred in this case that the particulate filter, which preferably is designed as a gasoline particulate filter, is arranged between the first three-way catalytic converter and the second three-way catalytic converter in the direction of flow of the exhaust gas.

The control device is designed to operate the hybrid drive system. The execution of the method according to the invention can therefore be coordinated by means of the control device. This means that commands to components of the hybrid drive system, such as, e.g., an injection pump for injecting fuel into the cylinders of the internal combustion engine, the transmission for setting a selected gear, the first clutch, the intake valves, the exhaust valves, and the belt-driven starter generator, can be generated and preferably also can be transmitted by means of the control device in order to carry out individual aspects of the method according to the invention. Moreover, the control device is designed to receive commands for operating the hybrid drive system, such as, e.g., a speed command from an accelerator pedal, from a limiting device for observing legal speed limits, from an input interface of a speed regulating device or the like, as well as a braking command from a brake pedal, from the limiting device, from the input interface of the speed regulating device, or the like. Moreover, the control device is preferably designed to monitor the hybrid drive system, such as, e.g., monitoring rotational speeds, temperatures, configurations, or the like of individual or multiple components of the hybrid drive system. The hybrid drive system preferably has no additional drivetrain generator for driving the motor vehicle.

To start with, the motor vehicle is brought to the first speed. This is preferably accomplished by accelerating the motor vehicle from a lower speed to the first speed. In this case, preferably the internal combustion engine and/or the drivetrain generator is/are controlled by the control device accordingly. Bringing the vehicle to the first speed can likewise be accomplished by decelerating it from a higher speed to the first speed. In this case, preferably a conventional braking device of the motor vehicle, such as a disk brake device, a drum brake device, or the like, is controlled by the control device to brake the motor vehicle. As an alternative to braking, the first speed can also be reached by allowing the motor vehicle to coast. The first speed is preferably higher than 50 km/h, and especially preferably higher than 100 km/h.

At the first speed, the control device brings about the operating state of the hybrid drive system in which the first clutch is disengaged. This can be accomplished by selectively disengaging the first clutch, for example. Alternatively, the first clutch can already be disengaged. A disengaged clutch is understood within the scope of the invention to mean a decoupled position of the clutch so that a torque flow through the clutch is interrupted. An engaged clutch is understood within the scope of the invention to be a coupled position of the clutch so that a torque flow through the clutch is established.

The internal combustion engine is shut off by means of the control device. This can be accomplished before or after disengaging the first clutch, for example. Preferably, shutoff of the internal combustion engine takes place after disengagement of the first clutch. Shutoff of the internal combustion engine is understood within the scope of the invention to mean that the internal combustion engine is no longer being operated in combustion-engine operation, so that the internal combustion engine provides no torque—aside from a moment of inertia of the still-rotating crankshaft—to drive the belt-driven starter generator or the motor vehicle.

If a braking demand for braking the motor vehicle is now produced, this is detected by the control device. The braking demand can be made, for example, by the actuation of the brake pedal by a driver of the motor vehicle, a manual input at the input interface of the cruise control device, the limiting device for observing legal speed limits, or the like. The control device analyzes the braking demand and performs actions to decelerate the motor vehicle in accordance with the braking demand.

An action performed within this framework comprises the determination by the control device of the potential crankshaft speed of the crankshaft in the case of a potentially engaged first clutch. Within this framework, a transmission output speed is determined, as well as a current gear ratio of the transmission. The potential crankshaft speed in the case of a disengaged first clutch corresponds to an actual crankshaft speed in the case of an engaged first clutch. Within this framework, provision can be made according to the invention that potential crankshaft speeds for different gears, and thus different gear ratios of the transmission, are determined, and an especially appropriate gear for braking the motor vehicle is chosen with which the potential crankshaft speed most closely approaches the first limit speed from below.

The control device compares the potential crankshaft speed determined for the current or preferred gear with the predefined first limit speed. The first limit speed is a rotational speed of the crankshaft with which the internal combustion engine can still be overrun comfortably. The first limit speed is preferably between 3000 and 4000 revolutions per minute.

When the potential crankshaft speed is lower than the first limit speed, the control device engages the first clutch so that the crankshaft of the internal combustion engine is mechanically coupled to the output of the hybrid drive system for the transmission of torque. The internal combustion engine is thus in an overrun mode and is driven through the output. The belt-driven starter generator that is mechanically coupled to the internal combustion engine is therefore being operated in recuperation mode and converts rotational kinetic energy into electrical energy. In this case, the internal combustion engine and the belt-driven starter generator provide a braking torque for braking the motor vehicle. In addition, an actuation of an additional, conventional braking device, such as a disk brake device, a drum brake device, or the like, can take place to brake the motor vehicle if the braking torque provided is not sufficiently high to meet the braking demand.

Finally, the control device configures the internal combustion engine in such a manner that the intake valves and/or the exhaust valves of the internal combustion engine remain closed during a rotation of the crankshaft of the internal combustion engine. Preferably, at a minimum the intake valves alone are closed. For this purpose, the intake valves or the exhaust valves are designed to be selectively electrically controllable, for example, so that no mechanical forced coupling exists between the rotation of the crankshaft and the intake valves or the exhaust valves. Alternatively, the intake valves or the exhaust valves can also be designed such that they can be uncoupled from a camshaft of the internal combustion engine. Consequently, a valve position of the intake valves or of the exhaust valves also remains constant, in particular closed, during a rotation of the crankshaft. As a result, no air is drawn in by the internal combustion engine and pumped into the exhaust system during overrunning of the internal combustion engine.

A method according to the invention for operating a hybrid drive system of a motor vehicle has the advantage over conventional methods that the belt-driven starter generator can be operated in recuperation mode with simple means and in an economical manner, wherein a delivering of air to the exhaust system is avoided by the selective configuration of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

According to an example of the invention, provision can be made in a method that the control device specifically configures the internal combustion engine in overrun in such a manner that the intake valves and exhaust valves deliver a predefined air flow into the exhaust system of the motor vehicle. This configuration preferably takes place shortly before a starting of the internal combustion engine. Further preferably, this configuration takes place at a vehicle speed at which the performance of this configuration can be carried out in an especially protective and low-wear manner. This has the advantage that a starting process of the internal combustion engine in a rolling motor vehicle can be improved with simple means and in an economical manner. Furthermore, combustion gas residues can be removed from the cylinders as a result.

The control device can control a fuel injection device for the selective injection of fuel into one or more cylinders of the internal combustion engine in overrun. The internal combustion engine is in an overrun mode, at least at the beginning of the selective injection, so that the fuel/air mixture in the cylinders does not ignite. This likewise preferably takes place shortly before a starting of the internal combustion engine. This has the advantage that the starting process of the internal combustion engine in a rolling motor vehicle can be improved with simple means and in an economical manner. Furthermore, a selective burnoff of oxygen from exhaust gas processing devices of the exhaust system, such as catalytic converters, particulate filters, and the like, can be achieved as a result.

The control device can actuate a conventional braking device to slow down the motor vehicle when the crankshaft speed is higher than the first limit speed. As a result, a greater deceleration of the motor vehicle, and thus a faster approach of the potential crankshaft speed to the first limit speed, can be achieved. Consequently, a time period between the detection of the braking demand and the engagement of the first clutch can be shortened. When the braking demand permits, the actuation of the conventional braking device is reduced or completely eliminated upon reaching the first limit speed so that further deceleration of the motor vehicle is accomplished by the internal combustion engine and the belt-driven starter generator. This has the advantage that a recuperation output for braking the motor vehicle can be maximized with simple means and in an economical manner.

The hybrid drive system can have a second clutch, which is arranged in the torque flow between the transmission and the output. Once the first speed is reached, the control device brings about an operating state of the hybrid drive system of a nature such that the first clutch and the second clutch are disengaged. The second clutch is engaged after detection of the braking demand. Disengaging the second clutch causes the transmission to be decoupled from the output so that a sailing operation of the motor vehicle is improved. The second clutch is engaged again to provide braking torque by means of the transmission. The engagement of the second clutch preferably occurs before or at the same time as the engagement of the first clutch. When the second clutch is engaged earlier, a small braking torque is initially provided by the transmission. An additional braking torque can be provided by the internal combustion engine and the belt-driven starter generator by means of subsequent engagement of the first clutch. This has the advantage that especially smooth braking and an especially efficient recuperation, in particular for relatively low braking demands, are ensured with simple means and in an economical manner.

The first clutch can be disengaged again when the motor vehicle reaches a second speed, wherein the second speed is lower than the first speed. Preferably the second speed is between 15 km/h and 30 km/h, especially preferably between 20 km/h and 25 km/h. Efficient recuperation by the belt-driven starter generator is no longer ensured below such a speed. After disengagement of the first clutch, further braking of the motor vehicle is accomplished by a conventional braking device, such as a disk brake device, a drum brake device, or the like. This has the advantage that especially smooth braking and an especially efficient recuperation are ensured with simple means and in an economical manner.

The configuring of the internal combustion engine by the control device includes a switching of a camshaft to null cams. Such switchable cams are already known in drive systems for motor vehicles that can be operated with a reduced number of cylinders in order to reduce fuel consumption and exhaust-emission output. In this case, the cams of the cylinders to be shut off can be decoupled from the camshaft so that the intake valves and/or exhaust valves of the shut-off cylinders remain in their positions, such as a closed position, during a rotation of the camshaft. The shut-off cylinders can be activated again in the event of an increased power output requirement such as, e.g. a kickdown, by coupling the respective cams to the camshaft. The switching of the camshaft preferably occurs while the internal combustion engine is rotating. This has the advantage that especially reliable closing of the intake valves or exhaust valves is ensured with simple means and in an economical manner.

Air can be evacuated from the exhaust system with an evacuation device of the hybrid drive system. As an alternative or in addition, an oxygen-free or oxygen-reduced gas is preferably introduced into the exhaust system by means of a gas supply device of the hybrid drive system to displace the oxygen located in the exhaust system. The evacuation device preferably has a vacuum chamber to hold the air. The evacuation device is preferably designed to evacuate the vacuum chamber again in combustion-engine operation of the internal combustion engine. The gas supply device preferably has a pressure chamber in which the gas can be stored. Preferably, the gas supply device is designed to fill the pressure chamber with exhaust gas of the internal combustion engine, preferably at a pressure above atmospheric pressure, in particular several times above atmospheric pressure, in combustion-engine operation of the internal combustion engine. This has the advantage that oxygen residues can be removed from the exhaust system with simple means and in an economical manner.

The object is also attained by a hybrid drive system for a motor vehicle. The hybrid drive system has an internal combustion engine with a belt-driven starter generator coupled thereto, a transmission, an exhaust system for the internal combustion engine, a control device, and an output. A first clutch is arranged between the internal combustion engine and the output. In accordance with the invention, the hybrid drive system according to the invention is designed to carry out a method according to the first aspect of the invention. The individual components of the hybrid drive system have already been described sufficiently in connection with the method according to the invention.

All the advantages already described with respect to a method for operating a hybrid drive system of a motor vehicle according to the first aspect of the invention also arise in the hybrid drive system according to the invention. Accordingly, the hybrid drive system according to the invention has the advantage over conventional hybrid drive systems that the belt-driven starter generator can be operated in recuperation mode with simple means and in an economical manner, wherein a delivering of air to the exhaust system is avoidable owing to the selective configurability of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

The object is also attained by a motor vehicle. In accordance with the invention, the motor vehicle has a hybrid drive system according to the second aspect of the invention. Accordingly, the hybrid drive system has an internal combustion engine with a belt-driven starter generator coupled thereto, a transmission, a drivetrain generator, an exhaust system for the internal combustion engine, and a control device. Arranged between the internal combustion engine and an output of the hybrid drive system is a first clutch. Arranged between the drivetrain generator and the output is a second clutch. In accordance with the invention, the hybrid drive system is designed to carry out a method according to the first aspect of the invention.

All the advantages already described with respect to a method for operating a hybrid drive system of a motor vehicle according to the first aspect of the invention and with respect to a hybrid drive system for a motor vehicle according to the second aspect of the invention also arise in the motor vehicle according to the invention. Accordingly, the motor vehicle according to the invention has the advantage over conventional motor vehicles that the belt-driven starter generator can be operated in recuperation mode with simple means and in an economical manner, wherein a delivering of air to the exhaust system is avoidable owing to the selective configurability of the intake valves and/or exhaust valves of the internal combustion engine. Consequently, an accumulation of oxygen in exhaust emission treatment devices of the exhaust system, such as catalytic converters, can be prevented and a complex and fuel-consuming burnoff of the oxygen can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
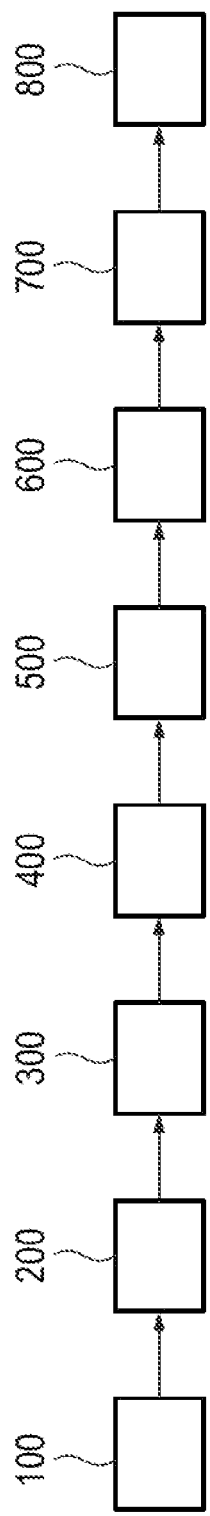
FIG. 1 is an example of a method according to the invention for operating a hybrid drive system of a motor vehicle in a flowchart.

In FIG. 1, an example of a method according to the invention for operating a hybrid drive system 1 (see FIG. 2) of a motor vehicle 2 (see FIG. 5) is represented schematically in a flowchart. Within the framework of a first method action 100, the hybrid drive system 1 is controlled by means of a control device 7 (see FIG. 2) of the hybrid drive system 1 in such a manner that the motor vehicle 2 is brought to a first speed. This is preferably accomplished by acceleration of the motor vehicle 2. According to a second method action 200, an operating state of the hybrid drive system 1, in which a first clutch 9 of the hybrid drive system 1 is disengaged, is brought about by the control device 7. This can be accomplished by disengaging the first clutch 9, for example. Alternatively, the first clutch 9 can already be disengaged, and thus remains in the disengaged position. According to a third method action 300, an internal combustion engine 3 of the hybrid drive system 1 is shut off by means of the control device 7.

According to a fourth method action 400, a braking demand for braking the motor vehicle 2 is detected by means of the control device 7. According to a fifth method action 500, a potential crankshaft speed of the crankshaft 10 in the case of a potentially engaged first clutch 9 is determined by the control device 7. The determination preferably takes place on the basis of a selected gear of a transmission 5 (see FIG. 2) of the hybrid drive system 1. According to a sixth method action 600, the potential crankshaft speed determined is compared with a predefined first limit speed by the control device 7. Within this framework, a preferred gear of the transmission 5 at which the potential crankshaft speed especially closely approaches the first limit speed, in particular from below, is preferably determined. Preferably, the preferred gear is engaged and the method is continued on the basis of the preferred gear. Provision can be made in this case that the preferred gear is determined again repeatedly, in particular when a vehicle speed of the motor vehicle decreases continuously.

According to a seventh method action 700, the first clutch 9 is engaged by the control device 7, so that the switched-off internal combustion engine 3 is operated in overrun. A belt-driven starter generator 4 (see FIG. 2) that is mechanically coupled to the internal combustion engine 3 is likewise operated in overrun in this case, and consequently is operated in a generator mode to generate electrical energy. Consequently, the internal combustion engine 3 and the belt-driven starter generator 4 provide a braking torque for braking the motor vehicle 2. According to an eighth method action 800, the internal combustion engine 3 of the hybrid drive system 1 is configured by means of the control device 7 in such a manner that intake valves and/or exhaust valves of the internal combustion engine 3 remain closed during a rotation of a crankshaft 10 (see FIG. 2) of the internal combustion engine 3. This is accomplished, for example, by decoupling the intake valves and/or exhaust valves from a camshaft of the internal combustion engine 3.

Figure 2:
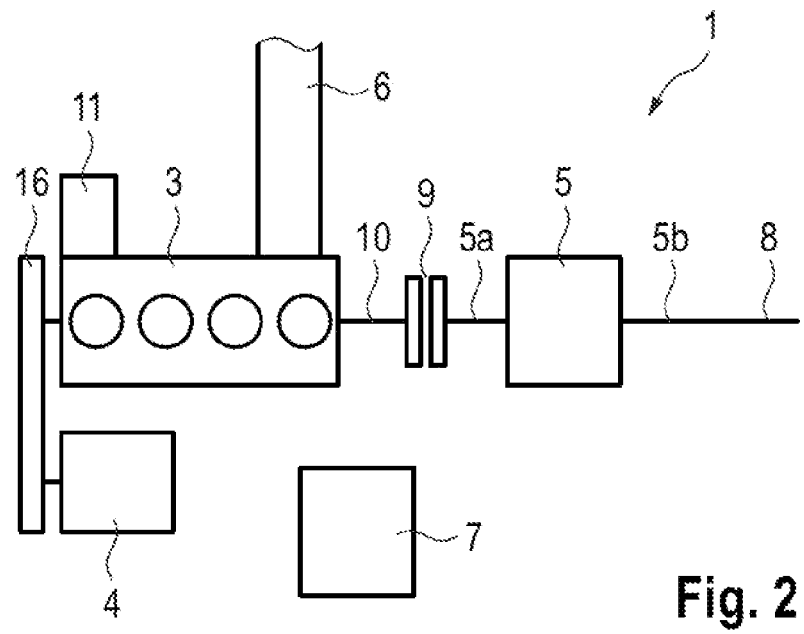
FIG. 2 is an example of a hybrid drive system according to the invention in a schematic diagram.

FIG. 2 schematically shows a preferred first embodiment of a hybrid drive system 1 according to the invention in a schematic diagram. The hybrid drive system 1 has an internal combustion engine 3, which is mechanically coupled to a belt-driven starter generator 4 by a belt drive 16. The internal combustion engine 3 has a fuel injection device 11 for injecting fuel into cylinders of the internal combustion engine 3. An exhaust system 6 of the hybrid drive system 1 is arranged on the internal combustion engine 3 for removal of the combustion gases. A crankshaft 10 of the internal combustion engine 3 can be mechanically coupled to and decoupled from a transmission input 5a of a transmission 5 through a first clutch 9. An output 8 is formed on a transmission output 5b of the transmission 5. The hybrid drive system 1 has a control device 7 for the purpose of controlling the components of the hybrid drive system 1.

Figure 3:
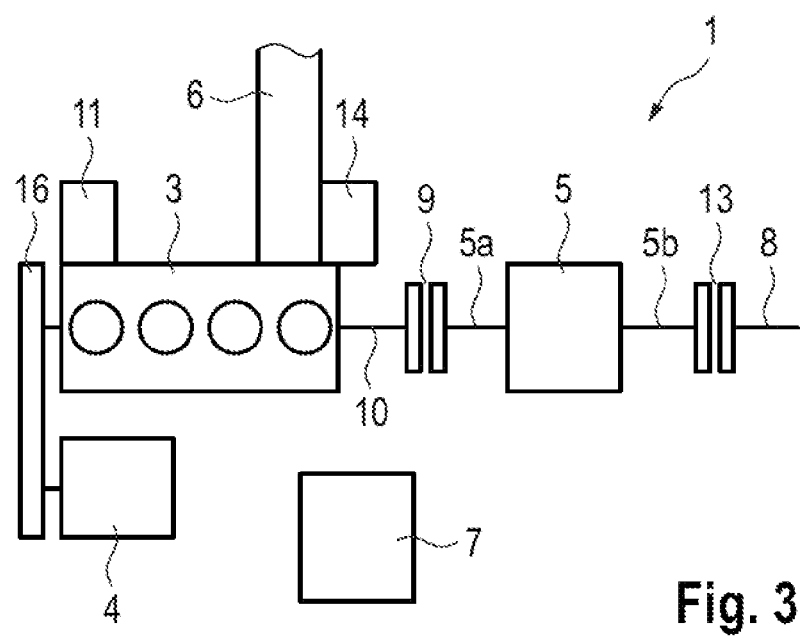
FIG. 3 is an example of a hybrid drive system according to the invention in a schematic diagram.

In FIG. 3, a preferred second embodiment of a hybrid drive system 1 according to the invention is schematically depicted in a schematic diagram. The second embodiment differs from the first embodiment in a second clutch 13, which is arranged between the transmission output 5b and the output 8. The transmission 5 can be uncoupled from the output 8 by means of the second clutch 13. Moreover, the hybrid drive system 1 has an optional evacuation device 14 for evacuating air from the exhaust system 6.

Figure 4:
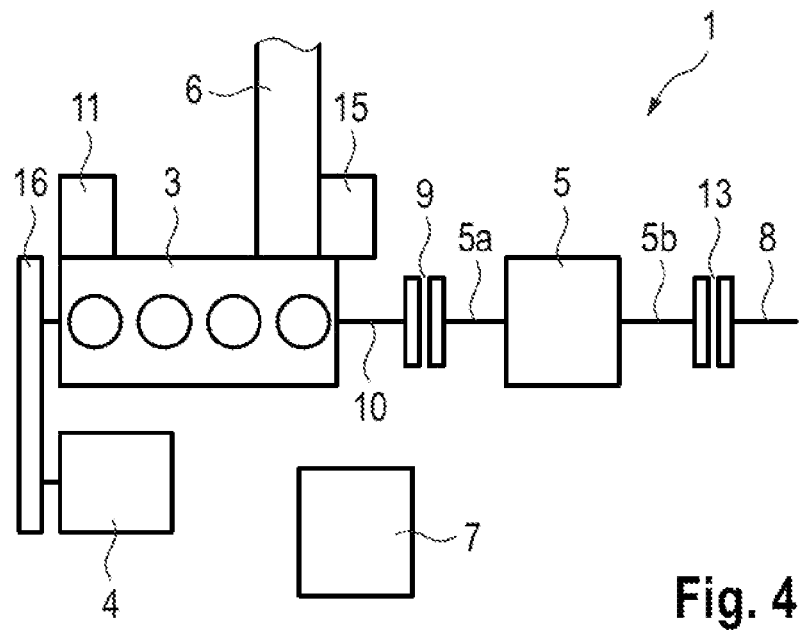
FIG. 4 is an example of a hybrid drive system according to the invention in a schematic diagram.

FIG. 4 schematically shows a preferred third embodiment of a hybrid drive system 1 according to the invention in a schematic diagram. The third embodiment differs from the first embodiment in a second clutch 13, which is arranged between the transmission output 5b and the output 8. The transmission 5 can be uncoupled from the output 8 by means of the second clutch 13. Furthermore, the hybrid drive system 1 has an optional gas supply device 15. The gas supply device 15 is designed to store combustion gases produced in working operation of the internal combustion engine 3 at a pressure above atmospheric pressure, and to conduct them to the exhaust system 6 when the internal combustion engine 3 is shut off in order to displace air from the exhaust system 6.

Figure 5:
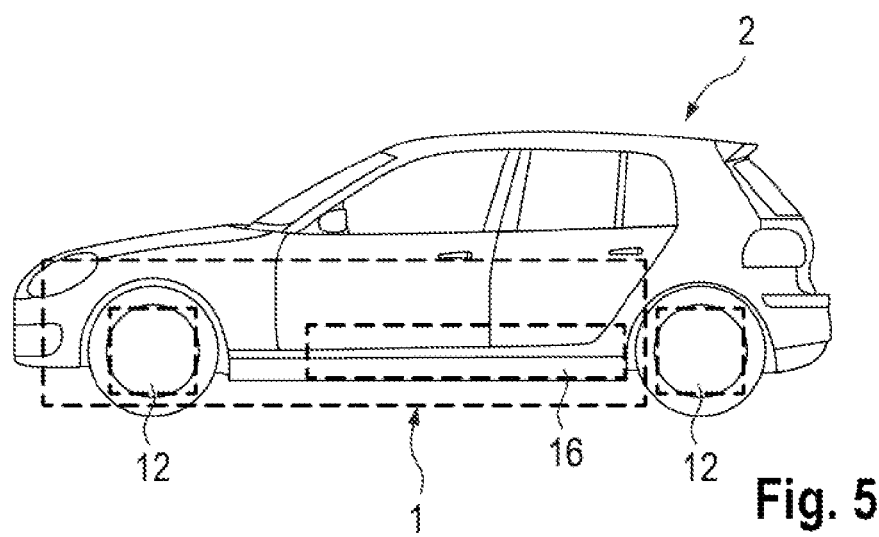
FIG. 5 is an example of a motor vehicle according to the invention in a side view.

In FIG. 5, a preferred fourth embodiment of a motor vehicle 2 according to the invention is shown schematically in a side view. The motor vehicle 2 has a hybrid drive system 1 according to the invention with a battery 17. Furthermore, the motor vehicle 2 has a conventional braking device 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for operating a hybrid drive system of a motor vehicle, wherein the hybrid drive system comprises an internal combustion engine with a belt-driven starter generator coupled thereto, a transmission, an exhaust system for the internal combustion engine, a control device, an output, and a first clutch arranged between the internal combustion engine and the transmission, the method comprising:
   bringing, via the control device, the motor vehicle to a first speed by controlling the hybrid drive system;
   bringing about, via the control device, an operating state of the hybrid drive system in which the first clutch is disengaged;
   shutting off, via the control device, the internal combustion engine;
   detecting, via the control device, a braking demand for braking of the motor vehicle;
   determining, via the control device, a potential crankshaft speed of a crankshaft of the internal combustion engine in the case of a potentially engaged first clutch;
   comparing, via the control device, the determined potential crankshaft speed with a predefined first limit speed;
   engaging, via the control device, the first clutch for overrunning the internal combustion engine as well as for operating the belt-driven starter generator in a recuperation mode when the crankshaft speed is lower than the first limit speed; and
   configuring, via the control device, the internal combustion engine such that with regard to intake valves and exhaust valves of the internal combustion engine, the intake valves alone remain closed while the crankshaft of the internal combustion engine rotates during the overrunning of the internal combustion engine.

2. The method according to claim 1, wherein the control device configures the internal combustion engine in overrun such that the intake valves and exhaust valves deliver a predefined air flow into the exhaust system of the motor vehicle.

3. The method according to claim 2, wherein the control device controls a fuel injection device for a selective injection of fuel into one or more cylinders of the internal combustion engine in overrun.

4. The method according to claim 1, wherein the control device actuates a conventional braking device to slow down the motor vehicle when the crankshaft speed is higher than the first limit speed.

5. The method according to claim 1, wherein the hybrid drive system has a second clutch, wherein the second clutch is arranged in a torque flow between the transmission and the output, wherein, once the first speed is reached, the control device brings about an operating state of the hybrid drive system such that the first clutch and the second clutch are disengaged, and wherein the second clutch is engaged after detection of the braking demand.

6. The method according to claim 1, wherein the first clutch is disengaged again when the motor vehicle reaches a second speed, and wherein the second speed is lower than the first speed.

7. The method according to claim 1, wherein the configuring of the internal combustion engine by the control device includes a switching of a camshaft to null cams.

8. The method according to claim 1, wherein air is evacuated from the exhaust system with an evacuation device of the hybrid drive system and/or in wherein an oxygen-free or oxygen-reduced gas is introduced into the exhaust system by a gas supply device of the hybrid drive system to displace oxygen located in the exhaust system.

9. A hybrid drive system for a motor vehicle, the system comprising:
   the internal combustion engine with the belt-driven starter generator coupled thereto;
   the transmission;
   the exhaust system for the internal combustion engine;
   the control device;
   the output; and
   the first clutch arranged between the internal combustion engine and the output,
   wherein the hybrid drive system is configured to carry out the method according to claim 1.

10. A motor vehicle comprising the hybrid drive system according to claim 9.

* * * * *